Figure 1:
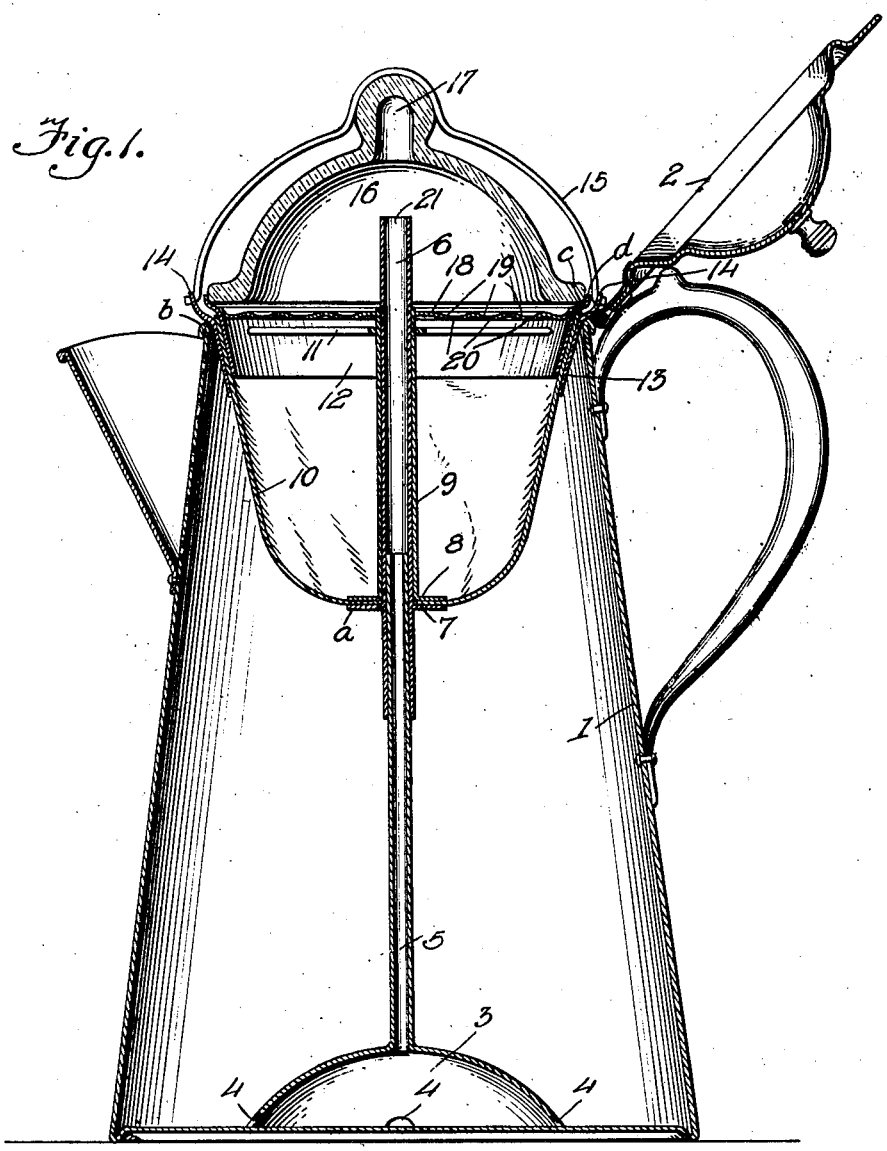

D. P. MOORE.
PERCOLATOR.
APPLICATION FILED FEB. 4, 1910.

959,955.

Patented May 31, 1910.
3 SHEETS—SHEET 1.

WITNESSES

INVENTOR

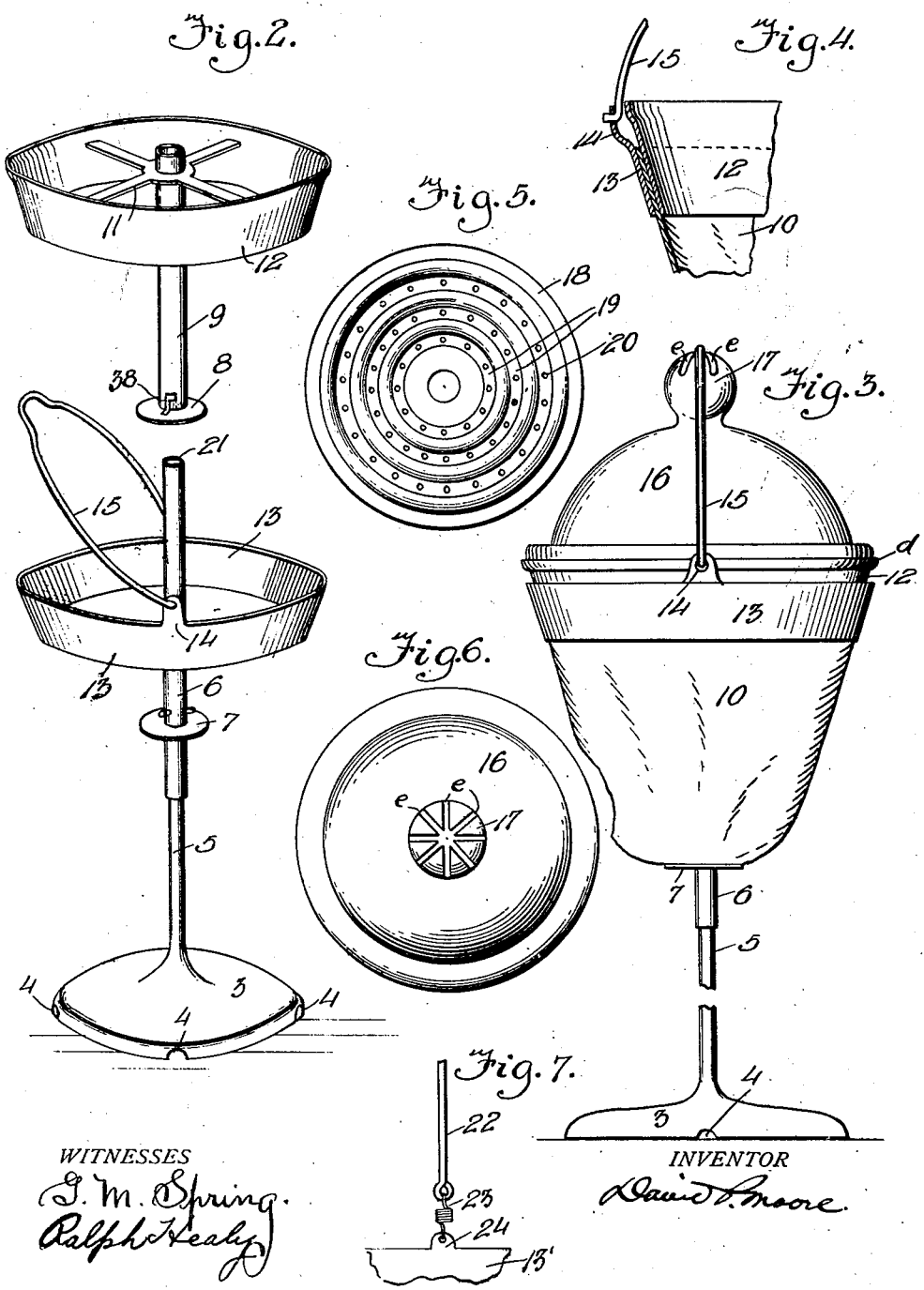

D. P. MOORE.
PERCOLATOR.
APPLICATION FILED FEB. 4, 1910.
959,955.
Patented May 31, 1910.
3 SHEETS—SHEET 3.
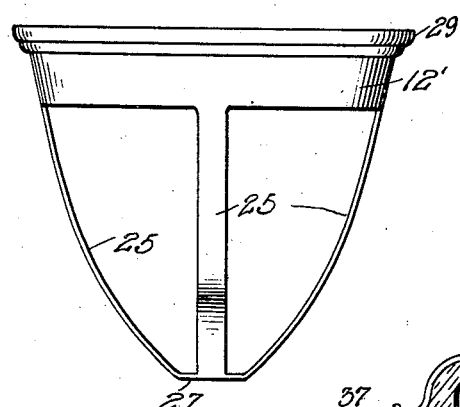
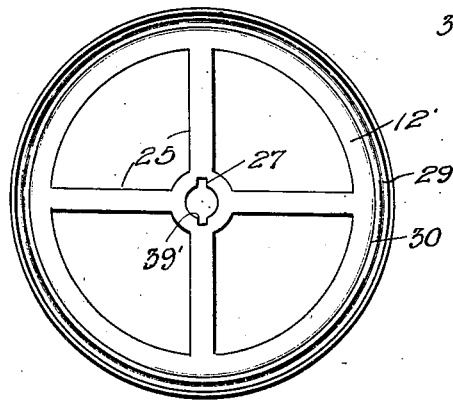
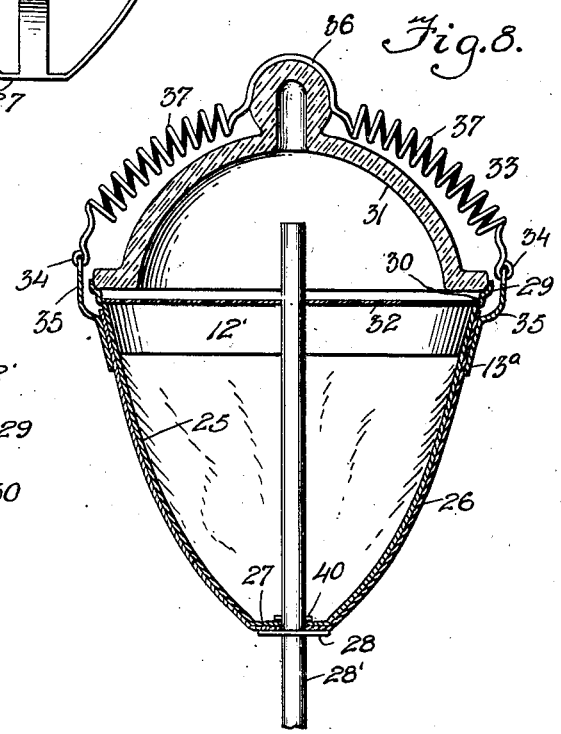
WITNESSES
INVENTOR

UNITED STATES PATENT OFFICE.

DAVID P. MOORE, OF WASHINGTON, DISTRICT OF COLUMBIA, ASSIGNOR OF ONE-HALF TO FRANK H. WALKER, OF WASHINGTON, DISTRICT OF COLUMBIA.

PERCOLATOR.

959,955.  Specification of Letters Patent.  Patented May 31, 1910.

Application filed February 4, 1910. Serial No. 542,161.

*To all whom it may concern:*

Be it known that I, DAVID P. MOORE, a citizen of the United States, residing at Washington, in the District of Columbia, have invented certain new and useful Improvements in Percolators, of which the following is a specification, reference being had therein to the accompanying drawing.

My present invention relates to improvements in percolators, and more especially designed for use in connection with the ordinary form of coffee or tea pot, whereby they are readily and quickly transformed into a percolator, which will properly secure the aroma from the ground coffee, without the attendant feature of grounds, and the necessity of employing egg-shells and cold water to settle or clarify the drink.

This percolator attachment, is made with the heating chamber adapted to enter the top opening of the ordinary pot and rest upon the bottom, the fountain tube leading upwardly therefrom being vertically and slidably adjustable to fit various heights of pots and at the same time, insure the heating chamber resting upon the center of the bottom. The basket is made preferably of a piece of cloth or screen, which is held in place by a support slidably and removably mounted upon the upper end of the fountain tube, while carried by the said support is also the glass cover or dome, against which the boiling liquid is projected and conducted back upon a perforated spreader also carried by the support. Co-acting with the support to secure the cloth or screen securely in place is a tapered band which corresponds to the tapered band of the support, while carried by this band is a wire handle or bail, which engages the top of the cover or dome, and by the action thereagainst clamps the cover in place and simultaneously clamps the cloth or screen immovably between the support and tapered band, and between the support and fountain tube, whereby the basket cover and fountain tube with the heating chamber, may be bodily removed from the pot, when desired.

To clearly demonstrate the advantages of my percolator, attention is invited to the accompanying drawings, in which:—

Figure 1 is a vertical central sectional view through my percolator and the pot, carrying the same. Fig. 2 is a perspective view of the various parts, except the cloth or screen, detached. Fig. 3 is a side elevation of the complete attachment assembled. Fig. 4 is an enlarged section through the supporting bands of the attachment. Fig. 5 is a top plan view of the spreader. Fig. 6 is a top plan view of the glass dome or cover. Fig. 7 is a detail view of a modified form of spring handle. Fig. 8 is a vertical sectional view of a modified form of attachment. Fig. 9 is a perspective view of the cloth support thereof. Fig. 10 is a top plan view thereof.

Referring to the drawings:—The numeral 1 designates the pot, which is provided with the usual cover 2.

My percolator, comprises the concaved heating chamber 3, which is circular and of a sufficient size or diameter to easily pass through the top opening of the pot, and have its lower edge resting upon the bottom of the pot, the lower edge being provided with the series of notches, recesses or apertures 4, whereby the liquid is permitted to enter the chamber, and the lower fountain tube or section 5, which projects centrally upward from the chamber, and thus conveys the heated or boiling liquid to the top of the percolator through the upper section 6, of the fountain tube, thus with the section 5, forming a telescoping or adjustable fountain tube, whereby pots of various heights may be employed with my percolator and not necessitate the construction of a special pot therefor.

Secured rigidly to the section 6, near its lower end is a flange or disk 7, which with the flange or disk 8, carried upon the lower end of the tube or sleeve 9, co-act to grip the central portion *a*, of the cloth or screen basket 10, in place. Carried by the upper end of the sleeve 9, is a spider 11, which secures the tapered band or basket support 12, to the sleeve 9, thus permitting the sleeve to carry said band and the disk 8 bodily therewith, the said sleeve being removably mounted upon the upper end of the tube 6 and being limited in its downward movement by the disk 7.

Adapted to fit within the mouth of the pot is the co-acting clamping tapered band 13, between which and the band 12 fits and is clamped the upper edge *b*, of the cloth or screen, the said band 13, being provided with the two opposed lugs 14, in which is pivotally mounted the bail wire handle 15, which is adapted to straddle the glass cover or dome 16, and force its lower edge $c$, into the flaring rim $d$, of the band 11, this action simultaneously forcing the sleeve 9, so that its disk 8 clamps the cloth between the disks 7 and 8, and the edge $b$, between the bands 12 and 13, the said bail handle in this position permitting the percolator to be bodily lifted by the said bail handle to place the percolator in the pot or remove it therefrom. The knob 17 of the cover or dome is provided with the grooves $e$, for the reception of the central portion of the bail.

Removably mounted over the upper end of the section 6 of the fountain tube and resting upon the band 12, is a spreader 18, which is provided with the series of concentric grooves 19, providing the perforations 20, whereby liquid sprayed through the opening 21, in the top of the fountain tube will be projected against the dome, and upon the spreader whose grooves and perforations spread the liquid and feed it upon the substance within the basket.

In Fig. 7, the bail handle 22, is provided with the spring connection 23, at each junction with the lug 24, of the band 13', this permitting a more easy action in clamping the cover or dome in place.

In the modified form illustrated in Figs. 8, 9 and 10, I deviate slightly from the construction described, in that the tapered band 12', which corresponds to the band 12, carries the series of strips 25, which conform and in reality form the shape of the bag or basket 26, which is exterior thereof and is held in place by the bail carrying and clamping band 13ª, and the central disk 27, and disk 28 carried by the fountain tube 28'. The upper edge of the band 12', is provided with the two rims 29 and 30, the rim 29, of which forms a seat for the lower edge of the cover or dome 31, while the rim 30, forms a seat for the perforated spreader 32, which fits over the upper end of the fountain tube and assists in holding the band 12' in place or centered. The handle 33, has its ends 34 secured to the lugs 35, of the band 13ª, and is provided with the knob engaging central portion 36 and the coiled grips 37, which provide a practically self-cooling grip for the fingers of the party removing the percolator, and insures against the burning thereof.

The sleeve 9 at its junction with the disk 8, is provided with the bayonet slot 38, which co-acts with the studs 39 carried by the section 6 of the fountain tube, thus providing a means whereby the fountain tube and heating chamber are connected bodily to the sleeve 9, and thereby insuring the movement of the same with the complete percolator. The disk 27 is provided with the oppositely arranged slots 39, which co-act with the studs 40, of the fountain tube 28', for the same reason.

From the foregoing description, it will be seen that by making the two bands which fit in the mouth of the pot tapering, that pots of various diameters, varying from the smallest diameter of the outer band to the extreme diameter at the top of the band, may be used; and that by making the fountain tube telescoping pots of various heights may be accommodated. I have found that when inserting the percolator, it is best to pull the tubes to almost their extreme extension, for when the heating chamber is seated upon the bottom of the pot, the basket may be pushed down until the outer band snugly fits within the mouth of the pot. By this means the proper working of the percolator is assured.

In making these percolator attachments, I propose to make them in various sizes, as for instance for one quart, two quart, three quart and four quart pots.

What I claim, as new, is:—

1. In a percolator, the combination of a heating chamber, a fountain tube, a drip basket, a cover for the basket, and means carried by the basket and accessible from the exterior of the basket and cover for clamping the cover to the basket and forming a means whereby the percolator may be bodily lifted by said means.

2. In a percolator, the combination of a heating chamber, a fountain tube, a drip basket, a cover for the basket, and a bail pivoted to the basket and adapted to engage the cover to clamp the cover upon the basket and form a handle for bodily lifting the percolator.

3. In a percolator, the combination of a heating chamber, a fountain tube, a drip basket, a cover for the basket, and a spring tensioned handle carried by the basket and adapted to engage the cover to clamp the cover upon the basket and form a handle for bodily lifting the percolator.

4. In a percolator, the combination of a heating chamber, a fountain tube, a drip basket, a cover for the basket, and a bail pivoted to the basket and having coiled portions intermediate of its ends, whereby the bail will clamp the cover to the basket and provide a handle for lifting the percolator.

5. In a percolator, the combination of a drip basket, a fountain tube, a heating chamber, a cover for the basket, a band surrounding the upper edge of the basket, and a bail handle pivoted to the band and adapted to engage the cover to clamp the cover and upper edge of the basket in place and act as a means whereby the percolator may be lifted bodily.

6. In a percolator, the combination of a drip basket, a fountain tube, a heating chamber, a cover for the basket, and means for clamping the cover to the basket and the basket upon the fountain tube simultaneously.

7. In a percolator, the combination of a drip basket, a fountain tube, a heating chamber, a cover for the basket, a band surrounding the upper edge of the basket and adapted to fit in the mouth of a pot, and means carried by the band for engaging the cover to clamp the cover upon the basket, the band upon the edge of the basket and the basket upon the fountain tube.

8. In a percolator, the combination of a drip basket, a fountain tube, a heating chamber, a cover for the basket, a band surrounding the upper edge of the basket and adapted to fit in the mouth of a pot while the heating chamber rests upon the bottom of the pot, and means carried by said band and accessible exteriorly of the band and cover for engaging the cover to hold the cover upon the basket and provide a means whereby the percolator may be bodily lifted.

9. The combination with a pot, of a percolator therefor comprising a basket having a tapered mouth, a fountain tube, a heating chamber, a cover for the basket, a tapering band surrounding the upper edge of the basket and fitting in the mouth of the pot, and means carried by the band and accessible exteriorly of the band and cover adapted to engage the cover to clamp the cover upon the basket and permit the percolator to be bodily movable into and from the pot.

10. The combination with a pot, of a percolator therefor, comprising a basket having a tapered mouth, a spreader fitting therein, a fountain tube, a heating chamber, a cover for the basket, a tapering band surrounding the upper edge of the basket and fitting the mouth of the pot, and means carried by the band and accessible exteriorly of the band and cover adapted to engage the cover to clamp the cover upon the basket and permit the percolator to be bodily movable into and from the pot.

11. The combination with a pot, of a percolator therefor, comprising a basket having a tapered mouth, a spreader fitting therein, a fountain tube, a heating chamber, a cover for the basket, a tapering band surrounding the upper edge of the basket and fitting the mouth of the pot, and a bail handle pivoted to said band and adapted to engage the cover to clamp the cover upon the basket and provide a handle to permit the percolator to be bodily movable into and from the pot.

12. In a percolator, the combination of a telescoping fountain tube, a heating chamber carried by the lower section thereof, a disk carried by the upper section, a tapering band, a disk adapted to slidingly fit upon the upper section of the tube and connected to the band, a basket having its center fitting upon the tube between said disks, another tapering band exterior of the first band and between which the upper edge of the basket is clamped, a cover adapted to fit upon the first band, and means accessible exteriorly of the cover carried by the last band and adapted to engage the cover and clamp the cover and basket in place.

In testimony whereof I affix my signature in presence of two witnesses.

DAVID P. MOORE.

Witnesses:
RALPH HEALY,
E. H. PARKINS.